United States Patent [19]
Derzhavets et al.

[11] 3,823,828
[45] July 16, 1974

[54] PROPELLING ARRANGEMENT FOR OIL AND GARBAGE SKIMMER CRAFT

[76] Inventors: Abram Yakovlevich Derzhavets, prospekt Gagarina, 4, kv. 5; Petr Grigorievich Kogan, ulitsa Perekopskoi divizii 2, kv. 14; Vladimir Nikolaevich Semenov, ulitsa Varnenskaya, 19, korpus 8, kv. 29; Viktor Iosifovich Tabachnikov, ulitsa Varnenskaya 19, korpus 8, kv. 31, all of Odessa, U.S.S.R.

[22] Filed: May 8, 1973

[21] Appl. No.: 358,360

[52] U.S. Cl............. 210/242, 210/83, 210/DIG. 21
[51] Int. Cl............................................. B01d 35/02
[58] Field of Search. 210/242, 136, 83, 84, DIG. 21

[56] References Cited
UNITED STATES PATENTS
3,767,055  10/1973  Flatland.............................. 210/242

Primary Examiner—Granville Y. Custer, Jr.
Assistant Examiner—DeWalden W. Jones
Attorney, Agent, or Firm—Eric H. Waters

[57] ABSTRACT

A propelling arrangement for self-propelled oil and garbage skimmer craft having a collecting receptacle, comprises a water jet and a duct for taking in water and delivering it to the water jet. The intake hole of the duct is located below the means for water inflow to the collecting receptacle of the skimmer craft, due to which a water stream entering the duct draws in the upper layer of water together with floating impurities towards the means for water inflow to the collecting receptacle.

5 Claims, 2 Drawing Figures

PATENTED JUL 16 1974  3,823,828

PROPELLING ARRANGEMENT FOR OIL AND GARBAGE SKIMMER CRAFT

The present invention relates to the equipment for clearing the surface of water basins, such as in ports, docks, coves, of floating impurities, for example, oil and oil products mixed with garbage, and has particular reference to propelling arrangements for a self-propelled oil and garbage skimmer craft.

Self-propelled skimmer craft for collecting water surface floating impurities into a receptacle are known whose propelling arrangements incorporate a water jet and a duct which takes in water and delivers it to the water jet.

The advantage of these oil and garbage skimmer craft is that the functions of propelling the craft and taking water containing floating impurities into its collecting receptacle are performed simultaneously by a single means, i.e. the water jet, thus allowing for a substantially simpler design and smaller dimensions of self-propelled oil and garbage skimmer craft.

A propelling arrangement is known for the oil and garbage skimmmer craft having a collecting receptacle, comprising a water jet and a duct through which water is taken in and delivered to the water jet.

In this arrangement, the functions of a duct for taking in water and delivering it to the water jet are performed by a collecting receptacle, and when this arrangement is in operation the entire amount of water delivered to the water jet passes through the collecting receptacle. The water flow delivered to the water jet draws in water together with impurities towards the inlet to the collecting receptacle, while the water flow from the water jet continuously lowers the level of water in the collecting receptacle to the required one to ensure the intake of surrounding water together with impurities to the collecting receptacle.

However, application of the known propelling arrangement for the self-propelled skimmer craft wherein water is cleaned of floating impurities in its collecting receptacle by way of settling, requires the latter receptacle to be of particularly large dimensions to reduce the water flow velocity to a value at which the efficient gravity settling process is possible.

When the dimensions of the skimmer craft are reduced which may be dictated by its operation in the crowded conditions of the port's water area, the satisfactory water settling process in the collecting receptacle can be achieved primarily by the corresponding reduction of the amount of water flowing through the receptacle, that is by reducing the water jet capacity which results in a very low operating capacity of the known skimmer craft.

It is, therefore, an object of the present invention to provide a propelling arrangement for the oil and garbage skimmer craft, wherein the water flow delivered to the water jet is separated from water containing floating impurities entering the collecting receptacle, and which at the same time draws in water together with floating impurities towards the inlet to the collecting receptacle.

It is another object of the present invention to ensure a difference in the level of water contained in the collecting receptacle and that of the surrounding water, which is needed for the inflow to the collecting receptacle of the surface layer of surrounding water together with floating impurities, by way of utilizing the water flow delivered to the water jet to draw water off the collecting receptacle.

It is one more object of the present invention to provide regulation of the intensity of drawing water off the collecting receptacle.

It is still an object of the present invention to provide such a propelling arrangement for the self-propelled oil and garbage skimmer craft which is capable of propelling said skimmer craft at a less than operating draught and at a higher than operating speed.

These objects are achieved due to the provision of a propelling arrangement for the oil and garbage skimmer craft having a collecting receptacle, comprising a water jet and a duct for taking in water and delivering it to the water jet, according to the invention, the intake hole of the duct is located below a means for water inflow to the collecting receptacle, due to which a water flow entering the duct induces drawing in the upper layer of water towards the collecting receptacle.

It is feasible that the arrangement would include an ejection passage which is approximately vertical, with an overflow weir installed in the ejection passage in the substantially vertical position and dividing said passage into two approximately equal parts, where one part communicates with said collecting receptacle, while the other — with the duct for taking in water and delivering it to the water jet, whereas the upper edge of the overflow weir should be positioned at a height corresponding to the predetermined water level in the collecting receptacle so that with the water jet operating, water is drawn off the collecting receptacle through the ejection passage to maintain the predetermined level.

It is desirable to install a throttle in the duct for taking in water and delivering it to the water jet, with the aim of regulating the intensity of drawing water off the ejection passage.

It is none the less feasible that the duct for taking in water and delivering it to the water jet would have a hole near the water jet to make the duct communicating with surrounding water, and a shutter which in its one position closes this hole in the duct and in another position it closes the duct cross-sectional area upflow of this hole in the direction of water flow in said duct.

The arrangement pursuant to the present invention, divides the water flow entering the skimmer craft into two streams with one of them being a surface layer of water which contains floating impurities, entering the collecting receptacle, and with the other being an underlying layer of water entering the duct for delivery to the water jet, thus ensuring simultaneous drawing in the surface layer of water together with floating impurities towards the intake of the collecting receptacle. At the same time, the water flow running through the duct towards the water jet, due to the effect of the ejection passage draws water off the collecting receptacle to provide a difference in the level of water in the collecting receptacle and that of the surrounding water, which is needed for the inflow to the collecting receptacle of the layer of water which contains floating impurities.

Owing to this layout of the propelling arrangement, the collecting receptacle receives together with floating impurities a minimum amount of water which makes it possible apart from the satisfactory settling of water to separate it from oil contained therein, to provide the collecting receptacle of relatively small dimensions, thus reducing the overall dimensions of the skimmer craft of the given operating capacity and also the consumption of energy for its propelling. Furthermore, drawing in the upper layer of water from a certain distance towards the intake of the collecting receptacle allows for the collection of impurities in narrow waters and hard-to-reach places difficult to access by the skimmer craft. Another advantage of the herein disclosed arrangement is a possibility for increasing the power rating of the water jet without altering the dimensions of the collecting receptacle, this permitting, if required, an increased skimmer craft propelling speed and a longer distance of drawing in floating impurities towards the intake of the collecting receptacle without substantial enlargement of the skimmer craft dimensions. Further advantage of the herein described arrangement is a possibility for increasing its propelling speed when running idle with no collection of impurities and at a lesser draught, which is achieved due to the provision of a shutter in the duct to open a hole therein near the water jet and to simultaneously close the cross-sectional area of the duct with a possibility for drawing in air through said hole when the skimmer craft turns at a reduced draught.

The invention will now be defined in detail by the description of its actual embodiment with reference to the accompanying drawings, in which.

Figure 1:
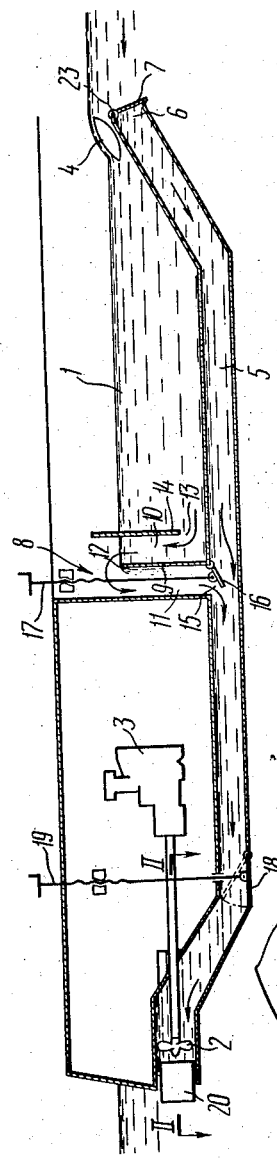
FIG. 1 is a longitudinal section through the propelling arrangement for the oil and garbage skimmer craft, according to the invention.

Propelling arrangement for the skimmer craft collecting water surface floating impurities in a receptacle 1 (FIG. 1) comprises a water jet 2 driven to rotate by an engine 3 of any known type, a means 4 for taking in the surface layer of water containing floating impurities to the collecting receptacle 1, of any known type, say in the shape of a damper installed at the intake of the collecting receptacle 1, a duct 5 for taking in water and delivering it to the water jet 2, intake hole 6 located just below the means 4 for taking in the layer of water containing floating impurities to the collecting receptacle 1. It is recommended that the hole 6 be closed with a grate 7 to prevent large objects from entering the duct 5.

Adjacent to the collecting receptacle 1 is an ejection passage 8 which is approximately vertical.

The ejection passage 8 houses a substantially vertical overflow weir 9 dividing the ejection passage 8 into two substantially equal parts 10 and 11. The upper edge 12 of the overflow weir 9 is positioned at a height corresponding to the predetermined operating water level in the collecting receptacle 1.

The collecting receptacle 1 communicates with the part 10 of the ejection passage 8 through an opening 13 in the lower portion of the wall 14. Part 11 of the ejection passage 8 communicates with the duct 5 through an opening 15.

Installed in the duct 5 upstream of the ejection passage 8 in the direction of water flow is a throttle 16 with a remote actuator 17 to regulate the intensity of drawing water off the ejection passage 8.

It is recommended that near the water jet 2 in the bottom wall of the duct 5 a hole is made to take in water and deliver it to the water jet 2 and a shutter 18 is provided with a remote actuator 19 to close said hole in the duct 5 in its one position or in its other position to close the cross-sectional area of the duct 5 upstream of said hole in the direction of water flow in the duct 5.

Figure 2:
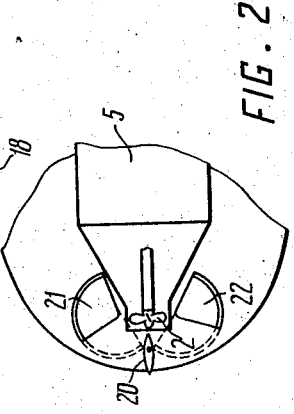
FIG. 2 is a section along II—II of the FIG. 1.

Installed in the duct 5 downstream of the water jet 2 in the direction of water flow are a door-type rudder 20 and reaction rudders 21 and 22 (FIG. 2) of any known type to maneuver the oil and garbage skimmer craft. The water jet 2 must be enabled to reverse its rotation for flushing by water flow the grate 7 (FIG. 1) if the latter is clogged up by algae or other objects, whereas the grate 7 for easier inspection should be pivoted on hinges 23 mounted at the top of the hole 6 of the duct 5.

Dimensions of the ejection passage 8 and position of the upper edge of the overflow weir 9 in height should be chosen depending on the dimensions of the collecting receptacle 1 with respect to the conditions of the desired quality of cleaning the water drawn off the collecting receptacle 1 from floating impurities.

Power rating of the water jet 2 and dimensions of the duct 5 should be determined with respect to the desired propelling speed of the self-propelled oil and garbage skimmer craft and the intensity of drawing in the upper layer of water containing floating impurities towards the means 4 for inflow to the collecting receptacle 1. Dimensions of the hole 6 of the duct 5 and position of the upper edge of the hole should be such that with the water jet 2 operating at the maximum capacity no water surface floating impurities could be drawn in said hole 6. Water surface floating impurities collected in the receptacle 1 are disposed of by applying any of the methods known.

The propelling arrangement for the oil and garbage skimmer craft having the collecting receptacle operates as follows.

With the water jet 2 operating, water enters the jet through the hole 6 in the duct 5, initiating a surface flow of water towards the intake to the collecting receptacle 1.

Simultaneously, the water flow running through the duct 5 produces the effect of ejection through the opening 15 on the column of water confined in the part 11 of the ejection passage 8. If the water level in the collecting receptacle 1 comes to be above the edge 12 of the overflow weir 9, the surplus water from the collecting receptacle 1 transfers through the opening 13 in the wall 14 to the part 10 of said ejection passage 8, then overflows above the weir 9 and via the opening 15 in the upper wall of the duct 5 is carried by the water flow running through the duct 5 due to the action of the water jet 2 to be finally discharged by the water jet into the surrounding water.

The surface layer of water containing floating impurities enters the collecting receptacle 1 and the depth of this layer is controlled by the means 4 so that the amount of water entering the collecting receptacle 1 is somewhat less than the amount of water drawn off said receptacle through the effect of the ejection passage 8. This provides for a stable process of feeding the collecting receptacle 1 with the surface layer of water containing floating impurities and the process is intensified by drawing in said surface layer due to the effect of the underlying layer of water entering the duct 5 through the hole 6.

Using the door-type rudder 20 and reaction rudders 21 and 22 (FIG. 2) it is possible to perform a continuous process of collecting water surface floating impurities with simultaneous maneuvering of the skimmer craft, i.e. in forward and reverse running, at zero propelling speed and in turning. If the skimmer craft is to be driven over a long distance without collecting floating impurities during its travel, a higher travel speed can be achieved through opening the hole in the duct 5 by means of the shutter 18 (FIG. 1) with simultaneous closing by said shutter 18 of the cross-sectional area of the duct 5 upstream of this hole.

With the cross-sectional area of the duct 5 thus closed a further increase in the travel speed of the skimmer craft is possible by reducing its draught without fearing of the water jet 2 taking in air through the intake hole 6 of the duct 5 which may turn to be above the water level.

What is claimed is:

1. A propelling arrangement for self-propelled oil and garbage skimmer craft having a collecting receptacle, comprising: a water jet; a duct for taking in water and delivering it to said water jet; an intake hole of said duct located below the means for water inflow to said collecting receptacle, due to which a water stream entering that duct induces drawing in the upper layer of water together with floating impurities towards said means for water inflow to said collecting receptacle.

2. An arrangement as claimed in claim 1, wherein provision is made for: a substantially vertical ejection passage; an overflow weir installed in said ejection passage in the approximately vertical position and dividing it into two approximately equal parts with one of them communicating with said collecting receptacle and the other — with said duct for taking in water and delivering it to the water jet; the upper edge of said overflow weir located at a height corresponding to the predetermined level of water in said collecting receptacle, whereas with the water jet operating, water is being drawn off said collecting receptacle through said ejection passage to obtain the predetermined water level in the receptacle.

3. An arrangement as claimed in claim 2, wherein provision is made for a throttle installed in said duct for taking in water and delivering it to the water jet, upstream of said ejection passage in the direction of water flow in said duct, to control the intensity of drawing water off said ejection passage.

4. An arrangement as claimed in claim 1, wherein said duct for taking in water and delivering it to the water jet has a hole near the water jet to communicate said duct with the surrounding water, and a shutter which in its one position closes said hole in said duct while in the other position it closes the cross-sectional area of that duct upstream of said hole in the direction of water flow in said duct.

5. An arrangement as claimed in claim 2, wherein said duct for taking in water and delivering it to the water jet has a hole near said water jet to communicate said duct with the surrounding water, and a shutter which in its one position closes said hole in said duct while in the other position it closes the cross-sectional area of that duct upstream of said hole in the direction of water flow in said duct.

* * * * *